Dec. 8, 1931.  G. M. BELLANCA  1,835,368
AIRPLANE LANDING GEAR
Filed Nov. 27, 1928  4 Sheets-Sheet 2
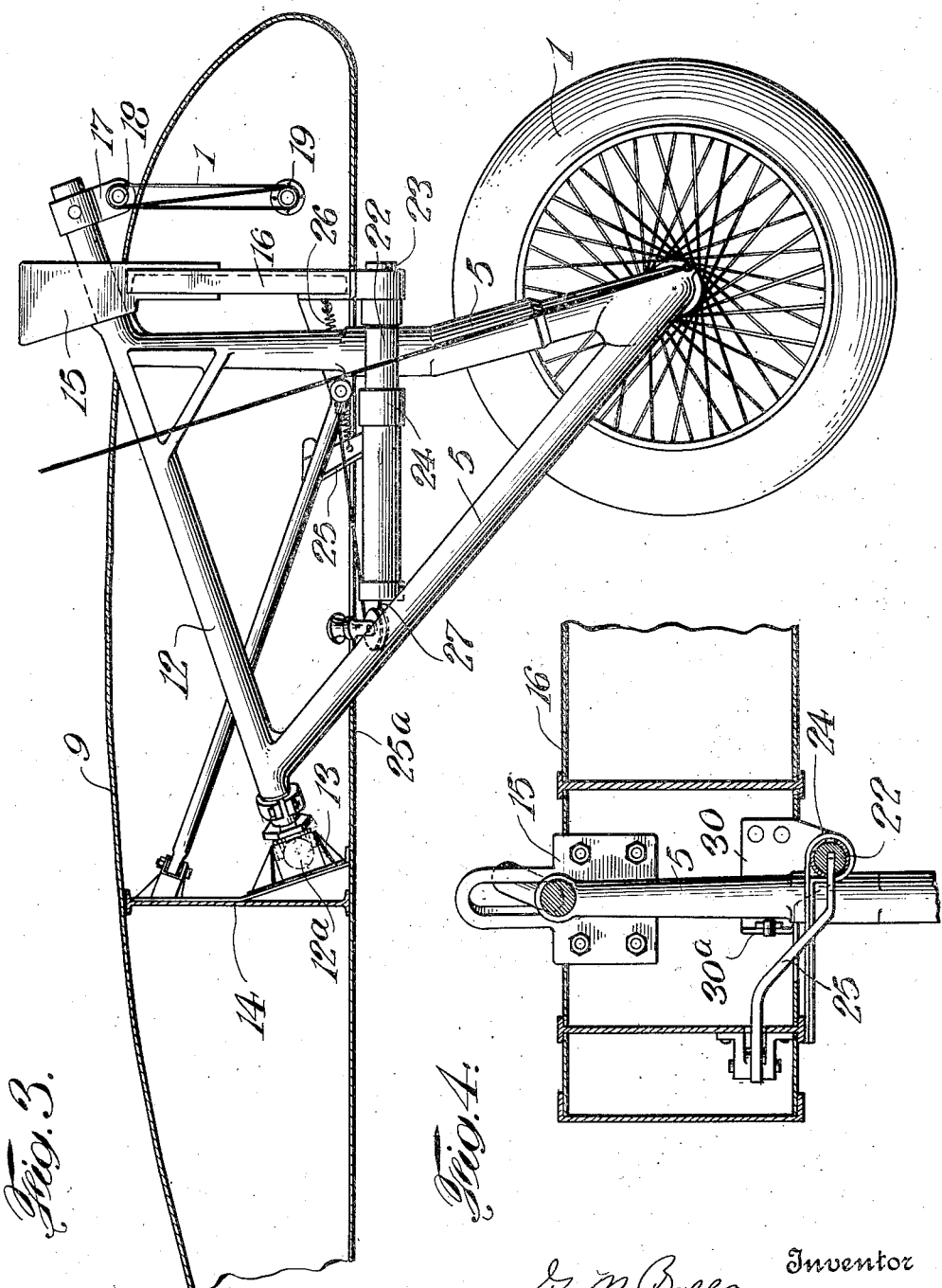

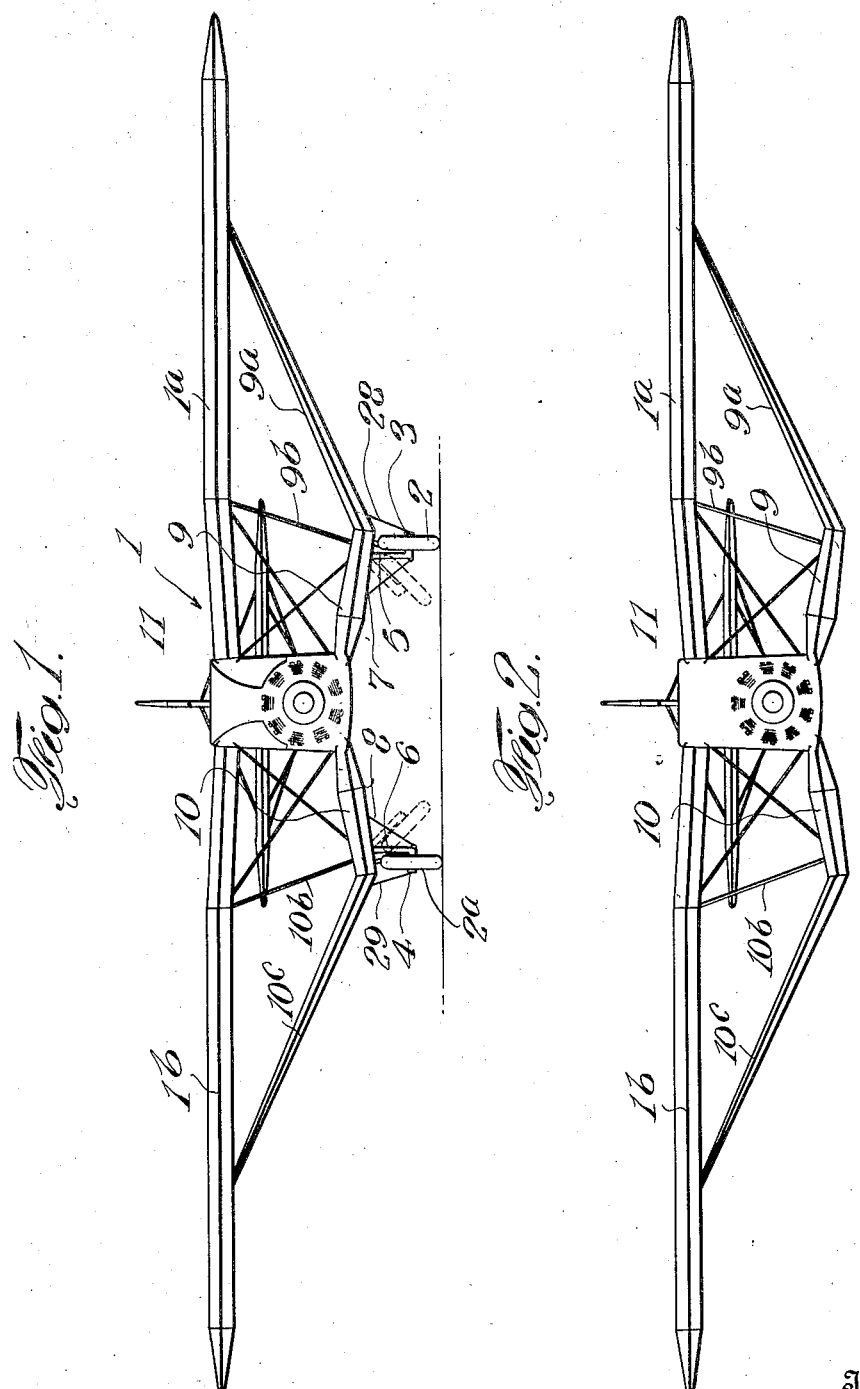

Dec. 8, 1931.  G. M. BELLANCA  1,835,368
AIRPLANE LANDING GEAR
Filed Nov. 27, 1928  4 Sheets-Sheet 3

Inventor
G. M. Bellanca
By his Attorneys
Hogue & Mary

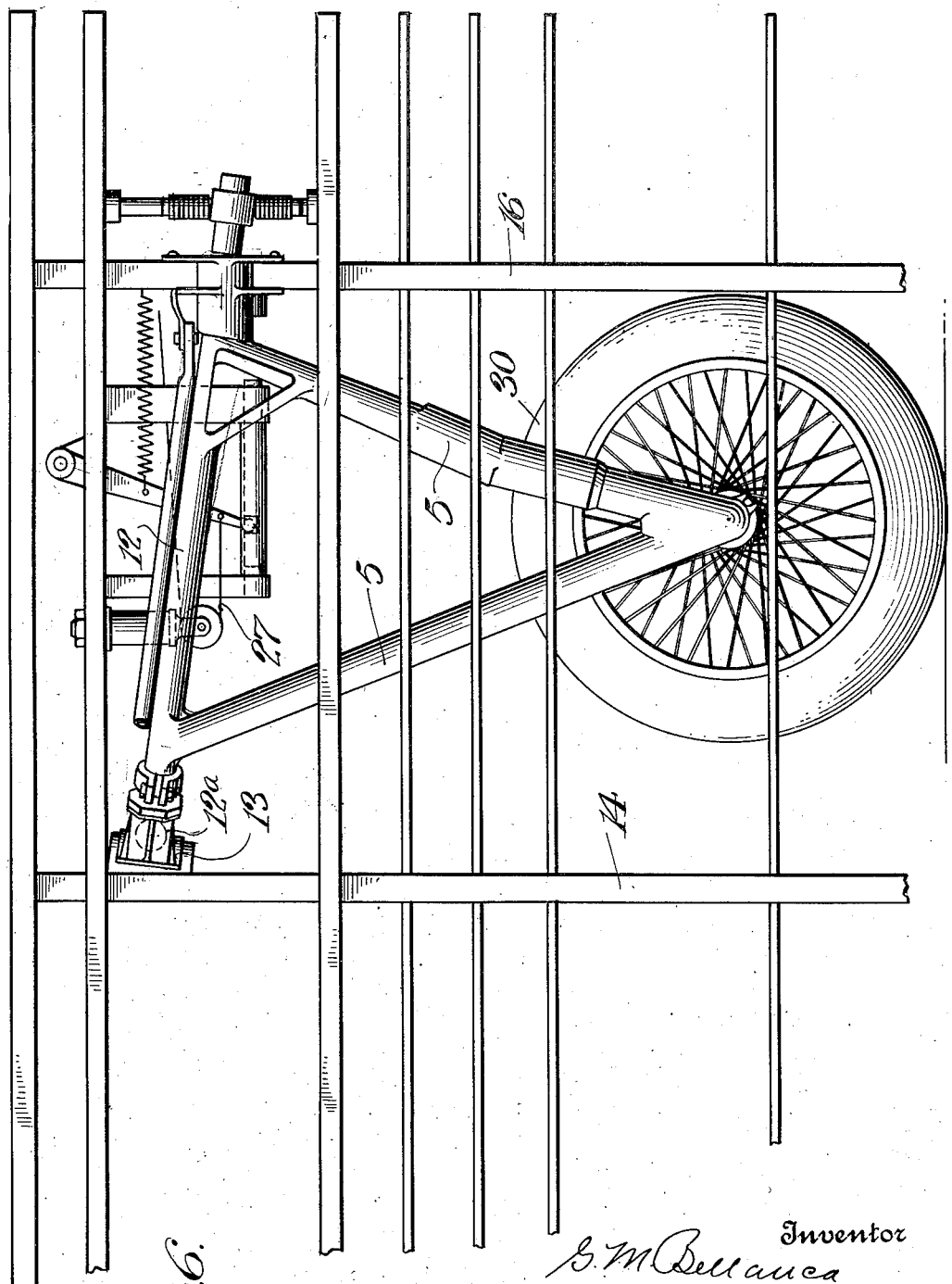

Patented Dec. 8, 1931

1,835,368

UNITED STATES PATENT OFFICE

GUISEPPE M. BELLANCA, OF WILMINGTON, DELAWARE

AIRPLANE LANDING GEAR

Application filed November 27, 1928. Serial No. 322,125.

This invention relates to a fully retractable landing gear for airplanes and will be understood from the following description read in conjunction with the drawings, in which Fig. 1 is a front view of an airplane with landing gear in operative position;

Fig. 2 is a front view of an airplane with landing gear fully retracted;

Fig. 3 is a transverse vertical section through a wing showing construction details;

Fig. 4 is a vertical section at a right angle to Fig. 3 and showing a part thereof;

Fig. 6 is a horizontal section through a wind showing a landing wheel in retracted position.

Figure 5:
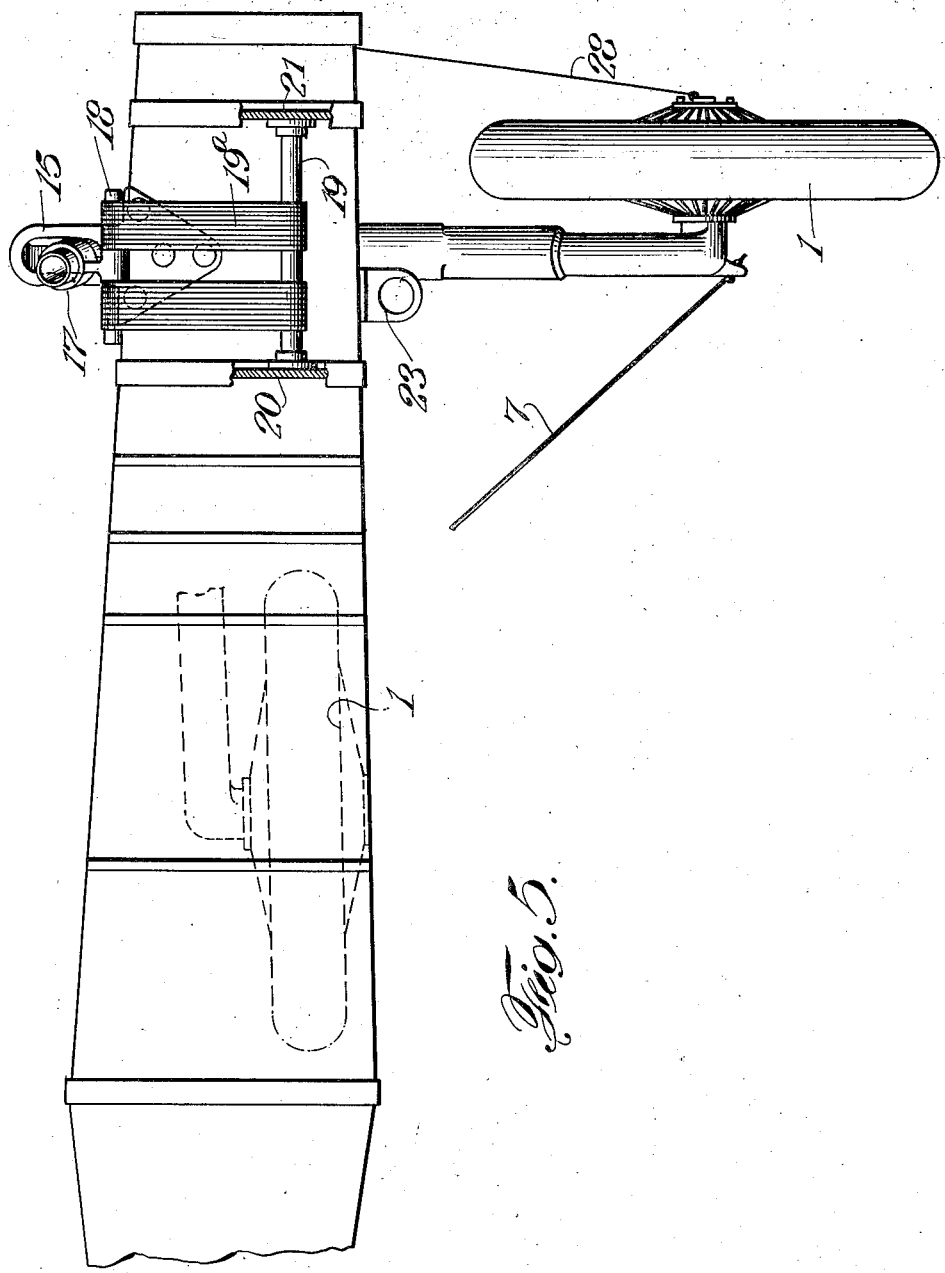
Fig. 5 is a front view of a part of an airplane.

The landing gear comprises the wheels 2 and 2a, Fig. 1, rotating on axles 3 and 4, respectively, which axles are carried by the arms 5 and 6. The arms and wheels carried thereby may be swung from operative position by means of the cables 7 and 8 to a position wholly within the wing structures 9 and 10. When so retracted the airplane presents the appearance shown in Fig. 2 and the flying resistance caused by projecting landing gear is entirely eliminated.

I am aware that landing gear for airplanes has been disclosed in which the landing wheels are swung into recesses in the lower surface of the under wings. My invention relates, however, to constructional details whereby a landing gear of this type may be economically and rigidly constructed and wherein the maximum ease and safety on landing may be achieved with a minimum of weight, utilizing the normal lifting members to support the landing means.

My landing gear is preferably, although not necessarily, applied to an airplane of the type illustrated in Figs. 1 and 2. This plane 1 comprises upper wings 1a and 1b which may be attached to the fuselage at their inner extremities in the conventional fashion. It also comprises the lower wings 9 and 10 attached to the lower portion of the fuselage at their inner extremities. These wings are preferably given a cathedral. They are preferably shorter than the upper wings, and from their outer extremities strut members 9a and 10a extend outwardly and upwardly to meet the upper wings 1a and 1b. These strut members are preferably so formed as to constitute in addition true wing surfaces, that is, about the strut, or struts, there are placed compression ribs and a true air foil lifting surface having the cross section of a normal wing structure. The members 9a and 10a may be hereinafter referred to as strut-wings. This wing structure preferably tapers and becomes of gradually reduced cross section in passing from the extremity of the stub wing to the point at which it joins the upper wing. Additional strut members may be employed between the wings 1a and 1b and the lower wings 9 and 10 and strut-wings 9a and 10a, such as, for example, 9b and 10b. The lower stub wings and the strut-wings which extend diagonally upward therefrom are so formed as to constitute a relatively rigid structure in which the extremities of the upper wings, outside of the point of attachment of the strut-wings 9a and 10a, are preferably of cantilever construction, while that part of the upper wings within the points of attachment constitutes, together with the lower wings and strut wings, a beam of exceptional strength and lightness with a maximum of lifting capacity. This is, in a measure, due to the fact that the lower wing is securely connected to the upper wing by means of the strut-wings 9a and 10a, respectively. My landing gear is carried by the stub wings 9 and 10, preferably adjacent the outer extremities thereof. Stresses incidental to landing are absorbed by the relatively strong combination of wing structures without the necessity for any extra supports for the landing means, while at the same time permitting the landing wheels to be positioned at a considerable distance from the longitudinal axis of the plane thereby yielding maximum stability on landing. The cathedral of the stub wings 9 and 10 in addition gives the maximum clearance of all parts of the plane other than the extremities of the stub wings by which the landing wheels are carried.

It will be understood that my landing gear may be applied to an airplane of the biplane type or to an airplane of the monoplane type, particularly where wings are connected to the fuselage adjacent the lower part thereof and with exceptional advantage where the wings have portions adjacent the fuselage which incline outwardly and downwardly.

By reference to Fig. 3 it will be observed that the wheel 1 is carried by the bifurcated arm 5 which is connected to the supporting member 12. The supporting member 12 terminates at one end, preferably the rear end, in a ball 12a which engages the socket joint 13, which in turn is rigidly connected to the rearward beam 14 of the wing 9; the other end of the supporting member projects through the upper wing surface and through the guide piece 15 which is rigidly secured to the forward beam 16. The guide piece is so formed as to substantially prevent lateral movement of the end of the supporting member 12, while permitting a limited vertical movement. The end of the supporting member which projects through the guide is engaged by some yielding means which tends to hold the supporting member downward in relation to the guide and to absorb or minimize shocks incidental to landing. For this purpose the supporting member 12 preferably carries a collar, such as 17, adjacent the end which in turn carries a rod 18. A rod 19, or other retaining means, is carried by the wing structure below the rod 18 and may be secured to the compression ribs 20 and 21, as illustrated in Fig. 5. Shock absorber cord 19a is wound connectedly about the rods 18 and 19, Fig. 5, and serves to take up landing shocks.

The landing wheel (Fig. 3) is held in operative position by means of a bolt 22 which projects forwardly into the socket 23 and which may be withdrawn into the cylinder 24 in order to release the arm 5 and permit retraction of the landing wheel. The socket 23 is rigidly secured to the forward beam by means of the lug 30, while the end of this lug 30 is in the form of a right angle 30a (Fig. 4) one side of which bears against the forward furcation of the arm 5, thereby preventing the arm 5 from being swung beyond operative position. When in operative position the arm 5 is rigidly secured between the bolt 22 and the abutment 30a, and that part of the arm 5 which projects below the normal wing structure is of cantilever construction so that no additional supporting means is required. The bolt 22 is held normally in locking position by means of the rod 25 pivotally secured to the bolt at one end and to a compression rib at the other end, and the spring 26 connected between the rod 25 and the forward beam 16 and adapted to hold the rod 25 under a forward tension. The withdrawal of the bolt 22 is effected by a pull on the cable 27, which cable is carried into the fuselage to a point accessible to the operator to permit manual control thereof.

The cables 7 and 8 which control the retraction of the landing wheels are also carried into the fuselage to a point accessible to the operator and, together with the cables 28 and 29, Fig. 1, which return the landing gear to operative position, are wound upon a drum so that the landing wheels may be either retracted or placed in operative position by the operator at any time. The drum preferably carries some locking device so that the cable may be secured when the wheel is fully retracted and thereby prevent the wheel dropping out of the wing structure.

It will be apparent from the foregoing, Fig. 6, that the landing wheels may be fully retracted by a single upward swing transverse to the direction of travel and returned to operative position by a single downward swing. When the wheel is fully retracted, Fig. 6, it lies in the space within the wing between the forward and rearward beams, the lower lifting surface and compression ribs being suitably cut away to accommodate the wheel and arm which carries it.

It will, of course, be understood that the foregoing specific description of an embodiment of my invention is by way of illustration and not of limitation. It is my intention that the invention be limited only by the appended claims, or their equivalents, in which I have endeavored to claim broadly all inherent novelty.

I claim:

1. Landing gear for airplanes comprising in combination a fuselage, wings projecting therefrom, forward and rearward beams in said wings, forwardly and rearwardly extending supporting members secured to one of said beams by ball and socket joints and secured to the other of said beams by guide pieces permitting limited vertical movement of the ends remote from the said ball and socket joints, wheel supporting arms projecting from said supporting members, landing wheel axles carried by said supporting arms, landing wheels mounted on said axles, recesses in said wings, means for swinging said landing wheels and supporting arms to carry said wheels from operative position into said recesses and the reverse.

2. Apparatus according to claim 1 in which the said arms are secured in operative position by means of an abutment and a bolt which bears against opposite sides of the said arms intermediate the said supporting members and the wheel axles, whereby that part of the said arms projecting below the wing surfaces is of cantilever construction.

3. Landing gear for airplanes comprising in combination a fuselage, airplane wings projecting therefrom, forward and rearward beams in said wings, forwardly and rearwardly extending wheel supporting members connected to one of said beams by ball and socket joints and extending through guide pieces secured to the other of said beams, which guide pieces permit limited vertical movement, wheel supporting arms projecting from said supporting members, landing wheel axles carried by said supporting arms, landing wheels mounted on said axles, recesses in the under surfaces of said wings, means for swinging said wheels and supporting arms from operative position into said recesses and the reverse, and yielding means connected to the ends of said supporting members which project through the said guide pieces adapted to absorb shocks consequent upon landing.

4. Landing gear for airplanes comprising in combination, a fuselage, wings extending therefrom, recesses in the under part of said wings, landing wheels, arms carrying said landing wheels, the said arms being pivotally secured to the said wings at a distance from the fuselage, means for swinging said arms to retract the said landing wheels into said recesses, abutments and bolts adapted to bear against said arms when the said landing wheels are in operative position at points intermediate the wheel axles and the point at which the said arms are pivotally secured to the said wing, that part of the arms projecting below the said bolts being of cantilever construction.

5. Landing gear for airplanes comprising in combination, a fuselage, wings extending therefrom, recesses in the under part of said wings, landing wheels, arms carrying said landing wheels, the said arms being pivotally secured to the said wings at a distance from the fuselage, means for swinging said arms to retract the said landing wheels into said recesses, and strut-wings extending outwardly and upwardly intermediate the ends of said lower wings and the said upper wings.

6. Apparatus according to claim 5, in which the said lower wings have a cathedral.

7. Airplane landing gear comprising in combination a fuselage, upper wings extending directly from the sides of said fuselage, relatively shorter lower wings extending directly from the sides of said fuselage, strut-wings extending outwardly and upwardly from the outer ends of said lower wings and connected to the said upper wings, and landing wheels carried by the said lower wings adjacent their outer extremities.

8. Airplane landing gear comprising in combination a fuselage, upper wings extending directly from the sides of said fuselage, relatively shorter lower wings extending outwardly and downwardly directly from the sides of said fuselage, strut-wings extending outwardly and upwardly from the outer ends of said lower wings and connected to said upper wings, and landing wheels carried by the said lower wings adjacent their outer extremities.

In testimony whereof, I have signed my name to this specification this 15 day of November, 1928.

GUISEPPE M. BELLANCA.